United States Patent
Shimoosawa et al.

(10) Patent No.: US 6,552,827 B1
(45) Date of Patent: Apr. 22, 2003

(54) IMAGE TRANSMISSION APPARATUS AND IMAGE TRANSMISSION METHOD

(75) Inventors: Hiroyuki Shimoosawa, Kanagawa (JP); Toshihiro Hata, Kanagawa (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/301,551

(22) Filed: Apr. 29, 1999

(30) Foreign Application Priority Data

Dec. 25, 1998 (JP) .......................................... 10-370615

(51) Int. Cl.[7] .............................................. H04N 1/32
(52) U.S. Cl. ........................................ 358/468; 358/450
(58) Field of Search ................................. 358/434, 400, 358/474, 435, 436, 442, 471, 468, 450; 382/312, 321

(56) References Cited

U.S. PATENT DOCUMENTS

| | | | | |
|---|---|---|---|---|
| 4,760,458 A | * | 7/1988 | Watanabe | 358/256 |
| 5,416,602 A | * | 5/1995 | Inga | 358/403 |
| 5,881,233 A | | 3/1999 | Toyoda et al. | 395/200.48 |
| 5,982,502 A | * | 11/1999 | Jinnai | 358/296 |
| 6,005,562 A | * | 12/1999 | Shiga | 345/327 |
| 6,154,289 A | * | 11/2000 | Hara | 358/434 |
| 6,249,644 B1 | * | 6/2001 | Inoue et al. | 386/130 |
| 6,278,526 B1 | * | 8/2001 | Kurozasa | 358/115 |

FOREIGN PATENT DOCUMENTS

| | | | | |
|---|---|---|---|---|
| JP | 3-79365 | 4/1991 | | |
| JP | 3-105066 | 10/1991 | | |
| JP | 5-122490 | 5/1993 | | |
| JP | 10210260 | 8/1993 | | |
| JP | 7-37110 | 2/1995 | | |
| JP | 11-88633 | * | 3/1999 | ............ H04N/1/32 |
| JP | 11-122577 | * | 4/1999 | ............ H04N/5/91 |

OTHER PUBLICATIONS

An English Language abstract of JP 7–37110.

* cited by examiner

*Primary Examiner*—Jerome Grant, II
(74) *Attorney, Agent, or Firm*—Greenblum & Bernstein, P.L.C.

(57) ABSTRACT

The facsimile apparatus according to the present invention comprises a decision section for checking whether or not the document edit flag is ON when the document sensor detects a document. When the document edit flag is ON, this decision section decides that edited image data are stored in edited document storage area 14A. Then, this decision section checks whether or not to send both the edited image data and paper document. When it decides that both should be sent, this decision section checks whether or not the paper document should be sent first. If the paper document is sent first, this decision section checks whether or not the edited image data should be inserted into the paper document. If the operator selects "Yes", this decision section decides that the paper document should be scanned by the scanner, sent one page at a time, and when the specified page appears the scanned image data should be sent followed by the rest of the paper document.

10 Claims, 10 Drawing Sheets

IMAGE TRANSMISSION APPARATUS AND IMAGE TRANSMISSION METHOD

BACKGROUND OF THE INVENTION

1. Field of the Invention

The present invention relates to facsimile apparatuses capable of transmitting a mixture of electronized images and paper documents.

2. Description of the Related Art

Information communication terminals such as (PDA: Personal Digital Assistants) incorporate a application software prepared for PC a so-called soft facsimile (hereinafter referred to as software facsimile) for transmitting images created or edited on an LCD display screen to recipient or displaying images received from recipient's fax on a screen. Such a software facsimile has an inconvenience of being unable to transmit paper documents at hand.

On the other hand, conventional facsimile apparatuses can receive images from recipient's fax and print them out by a printer, and scan paper documents and transmit them to recipient's fax. However, since they usually do not have an LCD display or input device, they have an inconvenience of being unable to create, edit or send images to recipient's fax.

In order to compensate for the shortcomings of both the software facsimile and normal facsimile apparatuses above, a simple solution could be a plain facsimile apparatus with a scanner and printer, further equipped with an LCD display and touch panel. It is also possible to propose a facsimile apparatus with a software facsimile function such as PDA.

However, in a plain facsimile apparatus which has simply incorporated a software facsimile, both functions remain independent of each other. Thus, while the facsimile apparatus is creating or editing a document on an LCD display screen, it functions as a software scanner and cannot send a paper document set in the scanner. On the contrary, when scanning a document with a scanner and sending the document, the facsimile apparatus functions as a normal facsimile, and thus it cannot send a document created or edited on the LCD display screen.

SUMMARY OF THE INVENTION

It is a first objective of the present invention to provide an image transmission apparatus capable of sending, through simple operations, documents created on a screen or scanned documents.

It is a second objective of the present invention to provide an image transmission method capable of sending, through simple operations, documents created on a screen or scanned documents.

It is a third objective of the present invention to provide a computer-readable storage medium capable Of sending, through simple operations, documents created on a screen or scanned documents.

That is, the above objective is achieved by An image transmission apparatus, having image storage section for storing image data, display section for displaying the image data, scanning section for scanning a document and obtaining other image data; and transmission section for transmitting a mixture of the image data and the other image data.

The above objective is also achieved by An image transmission apparatus, having scanning section for scanning a document and obtaining scanned image data, detection section for detecting that the document is set in the scanning start position of the scanning section, image storage section capable of storing image data other than the scanned image data, decision section for judging, when the detection section has detected the document, whether the image data are stored in the storage section; and facsimile transmission section for transmitting, when the decision section has decided that the image data are stored in the storage section, a mixture of the image data and the scanned image data.

The above objective is also achieved by A facsimile apparatus that transmits image data according to a facsimile protocol over a line, having a memory for storing image data, a display for displaying the image data, a scanner for scanning a document and obtaining other image data, and a facsimile communication device for transmitting a mixture of the image data and the other image data.

The above objective is also achieved by A facsimile apparatus that transmits image data according to a facsimile protocol over a line, having a scanner for scanning a document and obtaining scanned image data, a sensor for detecting that the document is set in the scanning start position of the scanner, a memory capable of storing image data other than the scanned image data, a decision device for judging, when the sensor has detected the document, whether or not the image data are stored in the memory; and a facsimile transmission device for transmitting, when the decision apparatus has decided that the image data are stored in the memory, a mixture of the image data and the scanned image data.

The above objective is also achieved by An image transmission method for an image transmission apparatus equipped with a scanning apparatus, having the steps of, storing image data, displaying the image, scanning a document by the scanning apparatus and obtaining other image data, and transmitting a mixture of the image data and the other image data.

The above objective is also achieved by An image transmission method for an image transmission apparatus equipped with a scanning apparatus, having the steps of scanning a document by the scanning apparatus and obtaining scanned image data, detecting that the document is set in the scanning start position of the scanning apparatus, storing image data other than the scanned image data, judging, when the document has been detected in the detecting step, whether or not the image data are stored, and transmitting, when it has been decided in the judging step that the image data are stored, a mixture of the image data and the scanned image data.

The above objective is also achieved by a computer-readable storage medium for storing a program code for instructing a computer having storage section for storing data, display section for displaying the data, scanning section for scanning a document and transmission section for transmitting the data, a program for executing the procedures of writing image data in the storage section, writing other image data in the storage section by making the scanning section scan the document, and reading the image data and the other image data and transmitting a mixture of them.

BRIEF DESCRIPTION OF THE SEVERAL VIEWS OF DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE

Preferred Embodiments

With reference now to the attached drawings, a communication terminal apparatus according to an embodiment of the present invention is explained in detail below.

Figure 1:
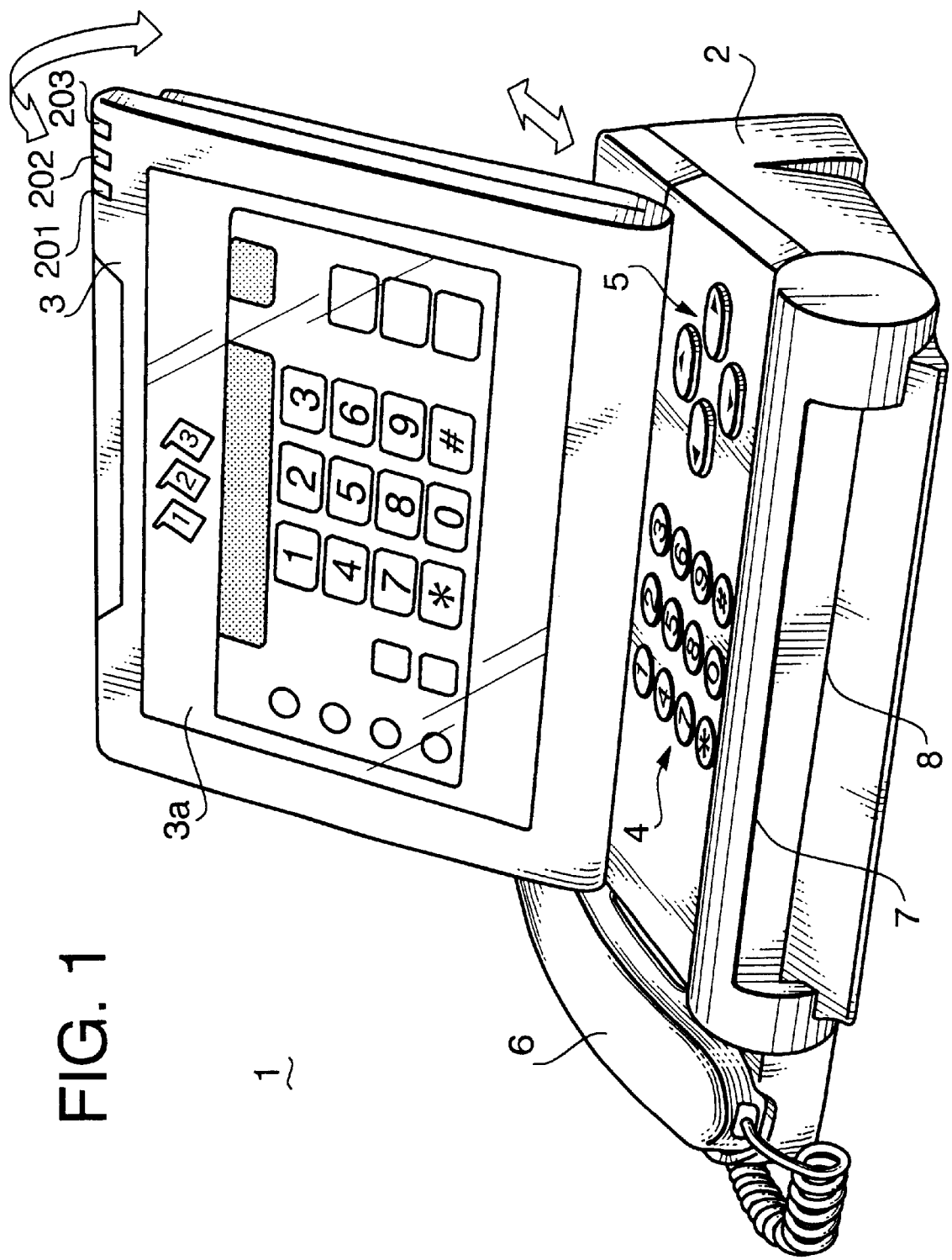
FIG. 1 is a perspective view showing a facsimile apparatus according to an embodiment of the present invention.

FIG. 1 is a perspective view showing a facsimile apparatus according to an embodiment of the present invention.

On the top panel of main body 2 of facsimile apparatus 1 a touch panel display 3 is attached in such a way that it can freely be opened/closed. Touch panel display 3 is designed to be laid on the top panel of main body 2 with screen 3a facing upward.

On the top panel of main body 2 is provided with dial keys 4 and cursor keys 5. Cursor keys 5 are an input device to freely move the cursor and pointer displayed on screen 3a in 4 directions. Dial keys 4 and cursor keys 5 are covered with touch panel display 3 when it is laid on the top panel as described above.

On one side of main body 2, is a handset 6 is provided. This example shows a case where a receiver with a cord is used as handset 6, but a cord-less receiver can also be used. On the front of main body 2 are printer paper discharge section 7 and scanner paper feeding section 8 are provided.

Furthermore, at the top right of touch display panel 3, power supply LED 201 indicating power ON/OFF, auto-answering LED 202 indicating auto-answering function ON/OFF, etc. and browser input LED 203 indicating whether or not the browser input dual function is used are provided in this order.

Figure 2:
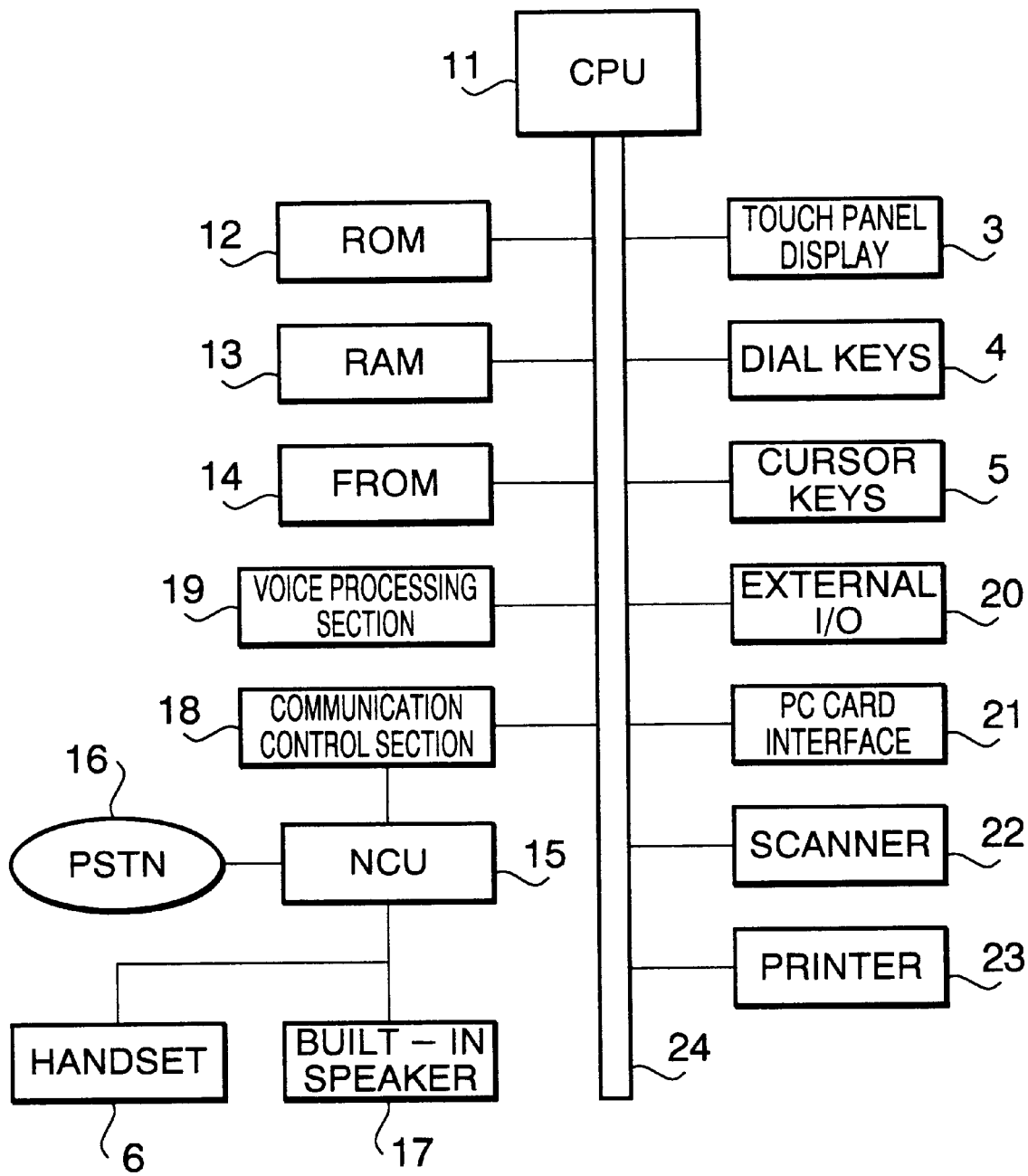
FIG. 2 is a hardware block diagram of the facsimile apparatus according to the embodiment above.

FIG. 2 is a hardware block diagram of the facsimile apparatus according to the embodiment above.

CPU (Central Processing Unit) 11 executes desired processing according to a program.

ROM (Read Only memory) 12 is a read only memory which stores basic programs such as a startup program.

RAM (Random Access Memory) 13 is a main memory in which CPU 11 loads and executes a program or data.

Flush memory (hereinafter referred to as "FROM") 14 is an erasable and rewritable non-volatile semiconductor memory. FROM 14 mainly stores executable programs such as application programs and data.

Network control unit (hereinafter referred to as "NCU") 15 controls transmission/reception of a signal to/from Public Switched Telephone Network (hereinafter referred to as "PSTN") 16. NCU 15 processes outgoing and incoming calls, etc. This NCU 15 is connected with handset 6 and built-in speaker 17.

Communication control section 18 performs data communications and facsimile communications via PSTN 16. This example shows a facsimile modem, but a DSU or terminal adapter (TA) can also be used. The facsimile modem also performs digitization of voice signals together.

Voice processing section 19 encodes and compresses a digitized voice signal or, inversely, decodes and decompresses a compressed voice signal.

Touch panel display 3 consists of an LCD panel display as a display section and a touch panel as an input device. Therefore, touch panel display 3 not only displays information but also accepts user operations. More specifically, screen 3a of touch panel display 3 displays various kinds of information, input screens, operation menus, icons and buttons, etc. Touching screen 3a with a pen or finger makes it possible to enter characters or pictures and select menus, etc.

Dial keys 4 are used not only for telephone dial operations but also for entering numbers, etc. in input fields displayed on touch panel display 3.

External I/O 20 controls data communications with external devices such as a PC, TA, barcode reader, and external modem. External I/O 20 is, for example, a serial interface, a parallel interface, IEEE (Institute of Electrical and Electronic Engineers) 1394 or USB (Universal Serial Bus).

PC card interface 21 controls data transmission/reception between a PC card and the main body 2. For PC cards, a variety of cards such as flush memory cards, modem cards, LAN cards and ISDN cards are available.

Scanner 22 scans documents. Printer 23 prints out various kinds of data such as images and text.

Bus 24 is a line that connects CPU 11 and other sections such as ROM 12 and RAM 13.

Figure 3:
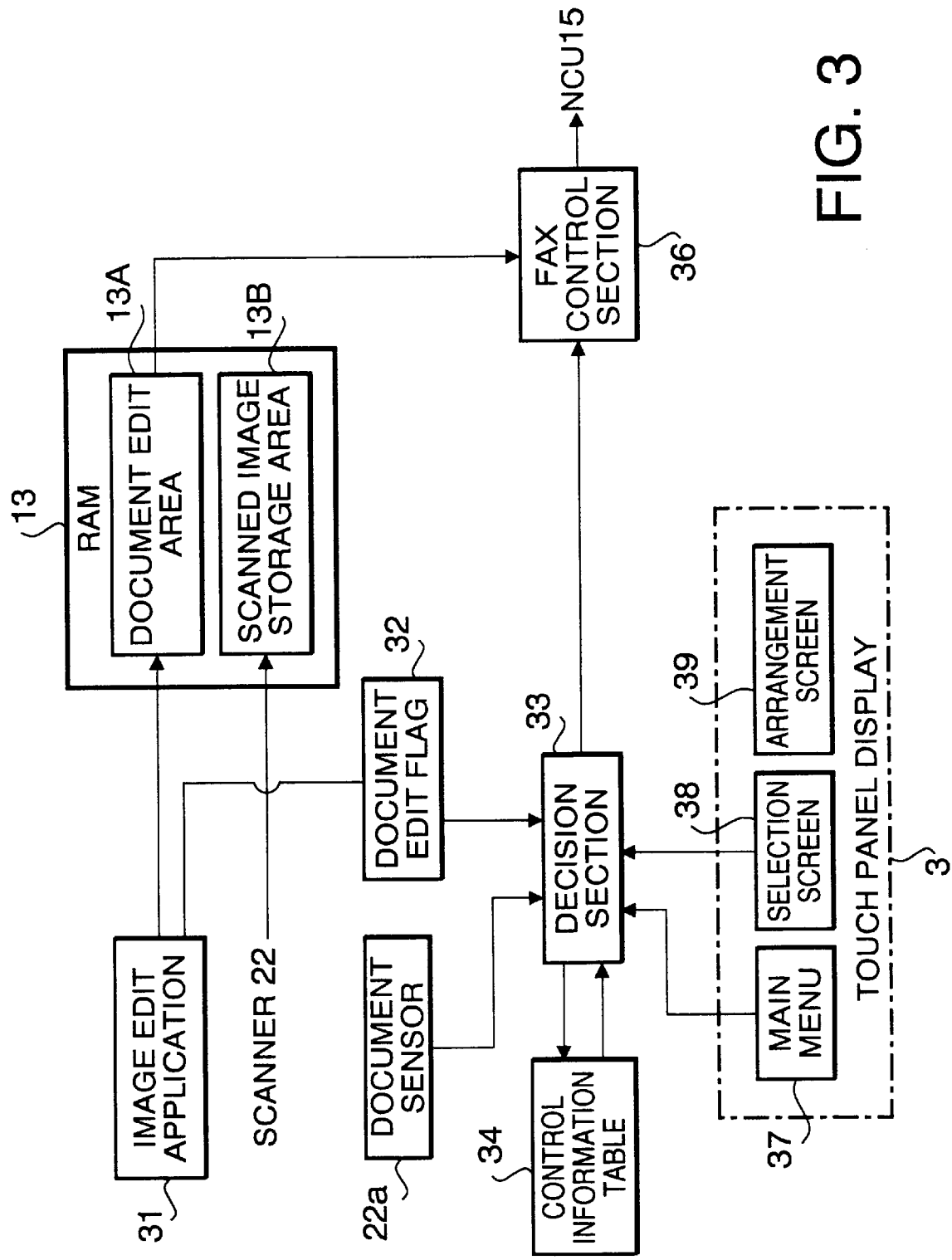
FIG. 3 is a functional block diagram of the facsimile apparatus according to the embodiment above.

FIG. 3 is a functional block diagram showing the facsimile apparatus according to the embodiment above.

Image edit application 31 is an application which is executed by CPU 11 on RAM 13 to create and edit images on screen 3a of touch panel display 3. Image data created or edited by image edit application 31 (hereinafter referred to as "edited image data") are stored in document edit area 13A in RAM 13.

Document edit flag 32 is set ON when image edit application 31 stores the edited image data in document edit area 13A and turned OFF when the edited image data are erased.

Decision section 33 decides whether to send the edited image data according to the detection result of document sensor 22a of scanner 22 and document edit flag 32 or image data scanned by scanner 22 (hereinafter referred to as "scanned image data") or a mixture of edited image data and scanned image data.

Control information table 34 retains page numbers and type information indicating whether the relevant image data are edited image data or scanned image data, which decision section 33 indicates for each image.

FAX control section 36 sends the edited image data end/or the scanned image data to PSTN 16 via NCU 15 according to a facsimile communication protocol.

Main menu 37, selection screen 38 and arrangement screen 39 are the screens displayed on touch panel display 3. Touching icons, etc. displayed on these screens with a pen or finger allows the operator's instructions for executing various operations to be entered.

Then, the operation of facsimile apparatus 1 configured as shown above is explained.

Figure 4:
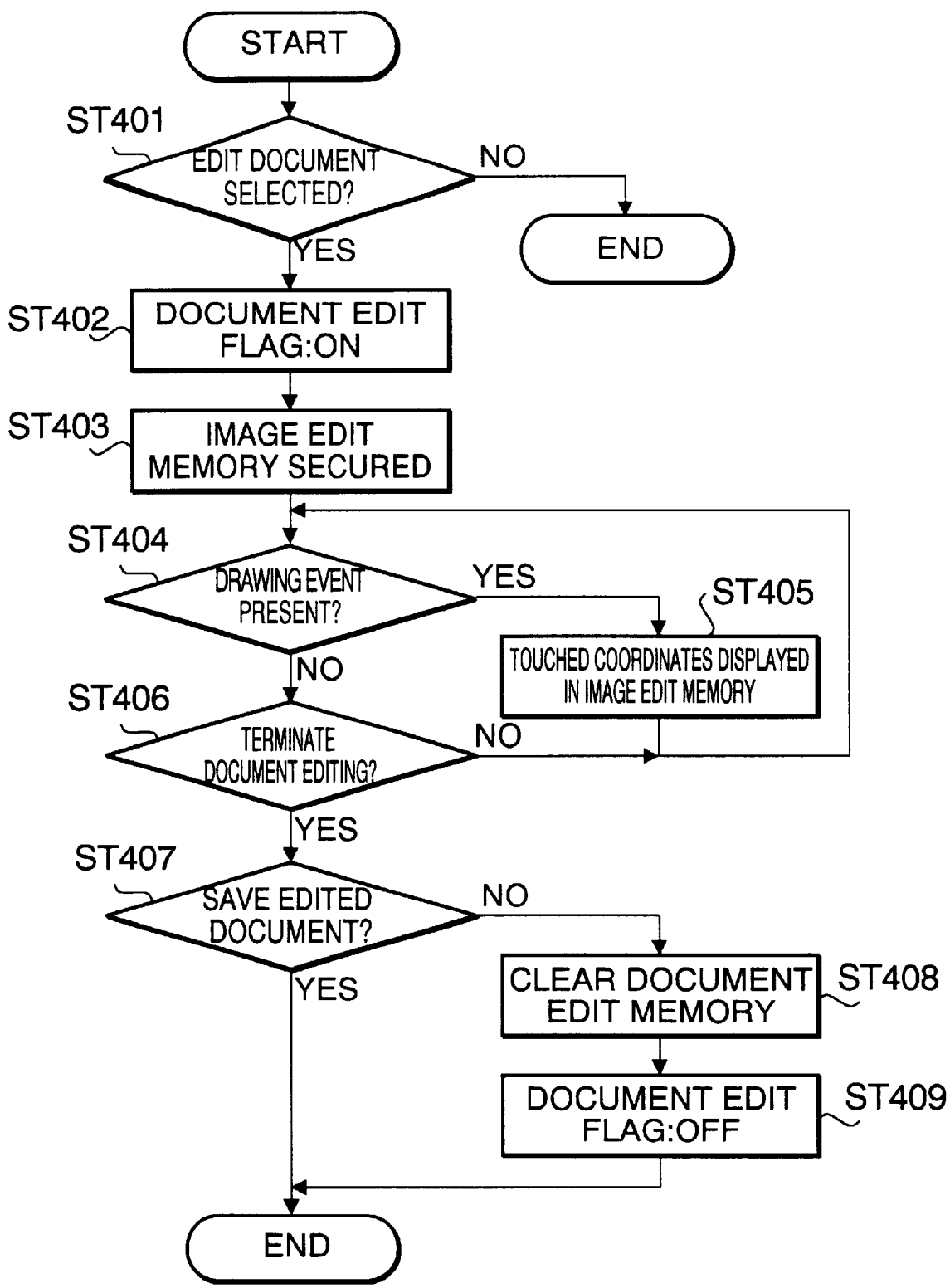
FIG. 4 is a flow diagram showing a document editing operation of the facsimile apparatus according to the embodiment above.

First, image creation and editing operations of facsimile apparatus 1 are explained. FIG. 4 is a flow diagram showing a document editing operation of facsimile apparatus 1 according to the present embodiment.

Figure 5:
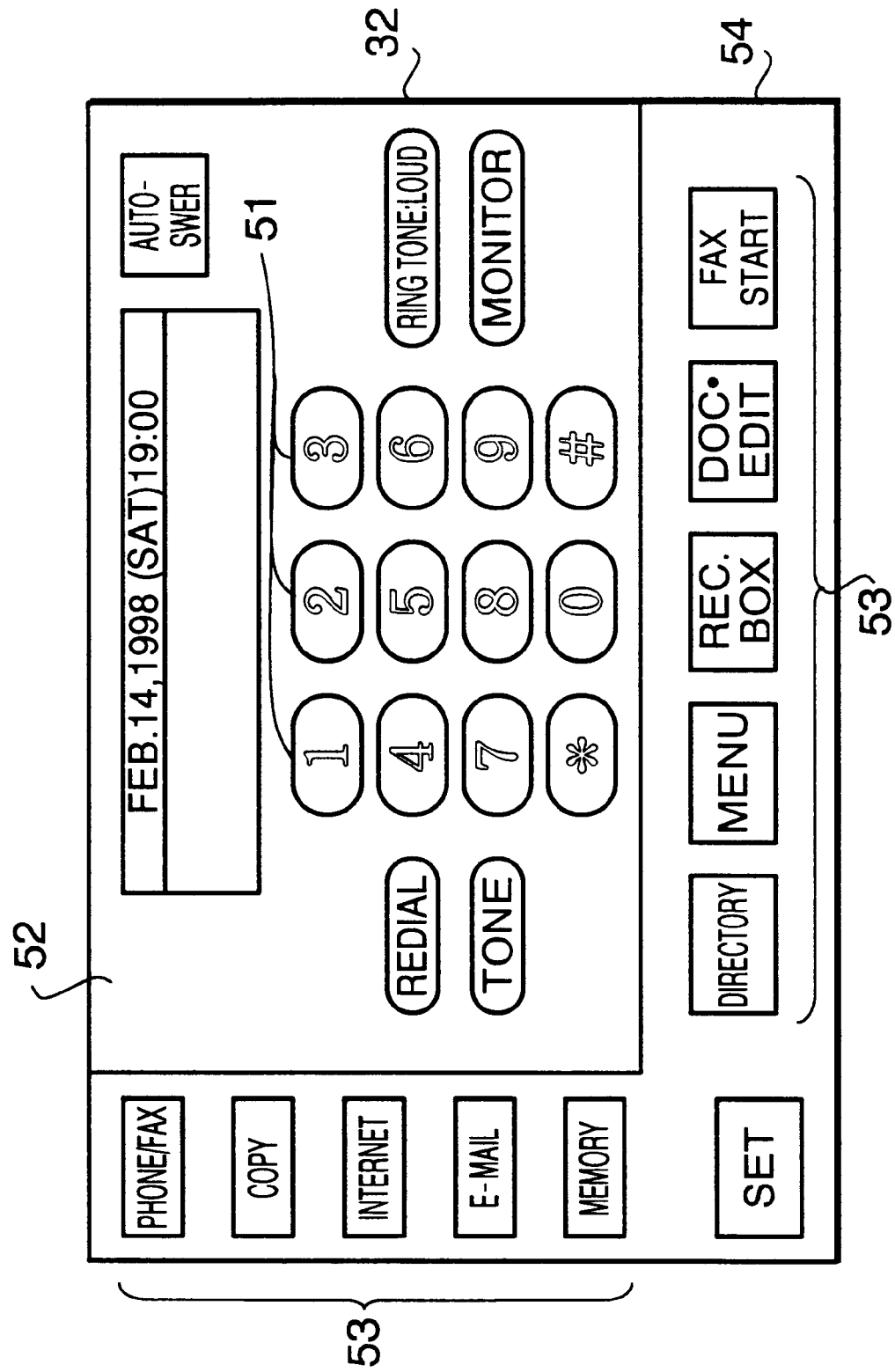
FIG. 5 is a drawing showing a main menu of the facsimile apparatus according to the embodiment above.

In an initial state, main menu 37 as shown in FIG. 5 is displayed on screen 3a of touch panel display 3 of facsimile apparatus 1. Main menu 3 includes dial area 52 containing dial icons 51 for dial inputs and operation panel area 54 having operation execution icons 53 placed outside dial area 52 for executing various operations.

In step (hereinafter referred to as "ST") 401, it is checked whether or not the operator has selected "Edit document" from operation icons 53 of main menu 37. If "Edit document" is selected, image edit application 32 is activated. In ST402, document edit flag 32 is set ON. Then in ST403, document edit area 13A necessary to create an image on screen 3a of touch panel display 3 is secured on RAM 13.

In ST404, it is checked whether or not a so-called drawing event, that is, the operator's action of touching screen 3a and drawing an image has occurred. If an event has occurred here, in ST405, coordinates on screen 3a indicating contacts of a pen, etc. are displayed at the corresponding positions on document edit memory 13A. Until document editing is completed, processing in ST404 to ST405 is repeated every time a drawing event occurs.

On the other hand, if no event has occurred, in ST406, it is checked whether or not termination of document editing has been instructed. If no instruction for termination has been given, the flow goes back to ST404 to check a drawing event. If a termination instruction has been given, in ST407, it is checked whether or not the edited document has been saved.

In ST407, it is checked whether or not the edited document should not be saved in document edit area 13A. Here, if the document is not saved, in ST408, document edit area 13A is cleared and document edit flag 32 is set OFF in ST409. Then, image edit application 31 is closed.

On the other hand, if the document should be saved, image edit application 31 is closed without clearing document edit area 13A. At this time, document edit flag 32 remains ON.

In the document editing operation above, a case where an image is created on screen 3a is explained, but an image scanned by scanner 22 can also be displayed on screen 3a, then edited by image edit application 31.

Setting flags about the presence of a document to be edited makes it easier to know whether or not a document to be transmitted is stored in memory. For example, when document edit flag 32 is ON, it is possible to display an icon indicating that the document to be transmitted is stored in memory on screen 3a of touch panel display 3. Moreover, it is also possible by lighting an LED, etc., to let the operator know that there is a document which has not been transmitted yet.

Then, a document transmission operation of facsimile apparatus 1 according to the present embodiment is explained. FIG. 6 through FIG. 9 are flow diagrams showing a document transmission operation of facsimile apparatus 1 according to the present embodiment. FIG. 10 is a drawing showing transitions between screens during document transmission in the facsimile apparatus according to the embodiment above.

In ST601, document sensor 22a detects that a paper document has been set in the scanning start position of scanner 22, that is, the upper end of a paper document has been inserted in scanner paper feeding section 8 shown in FIG. 1 The detection result is sent to decision section 33.

If a document is detected in ST601, decision section 33, in ST602, checks whether or not document edit flag 32 is ON. In ST602, if document edit flag 32 is OFF, the document is scanned by scanner 22 and the scanned image data are transmitted from FAX control section 36 in ST603.

On the other hand, in ST601, if no document is detected, in ST604 it is checked whether or not there is any instruction for FAX transmission. If there is an instruction for FAX transmission, in ST605 it is checked whether or not document edit flag 32 is ON.

If document edit flag 32 is ON, FAX control section 36 in ST606 transmits the edited image data stored in edited document storage area 14A.

In ST602, if document edit flag 32 is ON, the edited image data are stored in edited document storage area 14A. In this case, in ST607 shown in FIG. 7, decision section 33 checks whether or not both the edited image data and paper document should be sent. In this step, as shown in FIG. 10, screen 3a of touch panel display 3 displays selection screen 38 including "MIX", "PAPER" and "MEMORY" icons 101 to 103. If the operator touches "MIX" icon 101, then decision section 33 decides that both the edited image data and paper document are transmitted.

In this case, in ST608, decision section 33 checks whether or not the paper document should be sent first. In this step, as shown in FIG. 10, screen 3a displays arrangement screen 39A including "PAPER" and "MEMORY" icons 104 and 105. If the operator selects "PAPER", decision section 33 decides that the paper document should be sent first.

Then, if the paper document is sent first, in ST609, it is checked whether or not the edited image data are inserted in the paper document. In this step, as shown in FIG. 10, screen 3a displays arrangement screen 39B including "YES" and "NO" icons 106 and 107. If the operator selects "NO", in ST610, scanner 22 scans the paper document and the scanned image data are sent to FAX control section 36. When transmission of the scanned image data is completed, the edited image data are sent by FAX control section 36 and the operation completes here.

On the other hand, in ST607, if the operator selects "PAPER" or "MEMORY" on selection screen 38, decision section 33, in ST612, checks whether or not the edited image data should be sent. Here, if the operator touches "MEMORY" icon 103 to send the edited image data, in ST613, the edited image data are sent by FAX control section 36 and the operation completes here. If the operator touches "PAPER" icon 102 to select transmission of the scanned image data, in ST614, the paper document is scanned by scanner 22 and the scanned image data are sent by FAX control section 36 and the operation completes here.

Figure 8:
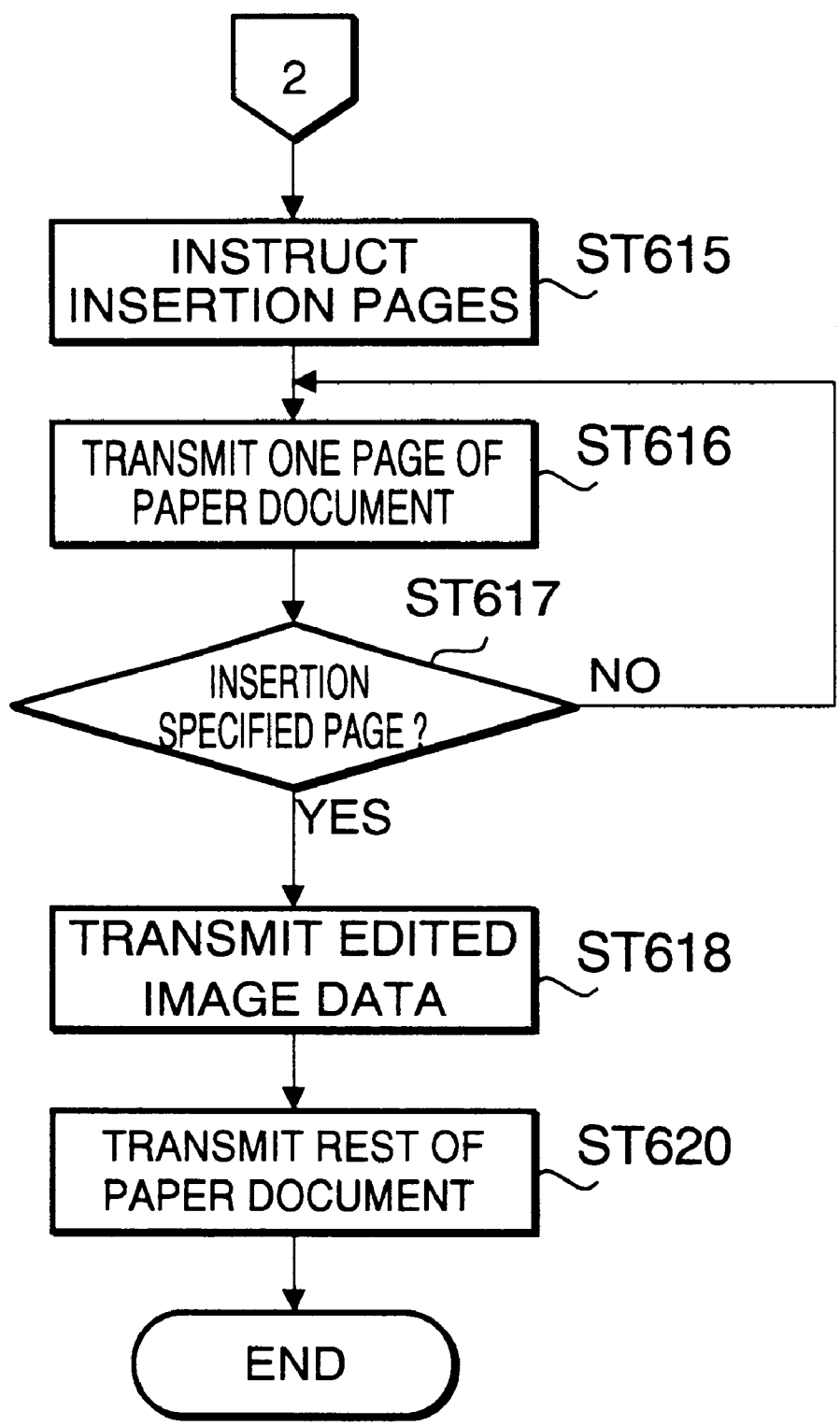
FIG. 8 is a flow diagram showing a document transmission operation of the facsimile apparatus according to the embodiment above.

In ST609 above, if the operator selects "YES", the flow advances to ST615 as shown in FIG. 8 and a page in which the edited image data are inserted (hereinafter referred to as "insertion specified page") is set. As shown in FIG. 10, arrangement screen 39D is displayed on screen 3a. The operator sets the insertion specified page by entering the desired insertion page and touching setting button 110.

Then in ST616, one page of the paper document is sent. In ST617, decision section 33 checks whether or not the next page is the insertion specified page. If it is not the insertion specified page, the flow goes back to ST616 and the next paper document is scanned by scanner 22 and the scanned image data are sent by FAX control section 36.

In ST617, if the next page is the insertion specified page, the edited image data, in ST618, are sent by FAX control section 36 and the rest of the paper document is scanned by scanner 22 in ST619 and the scanned image data are sent by FAX control section 36, which completes the operation.

Figure 9:
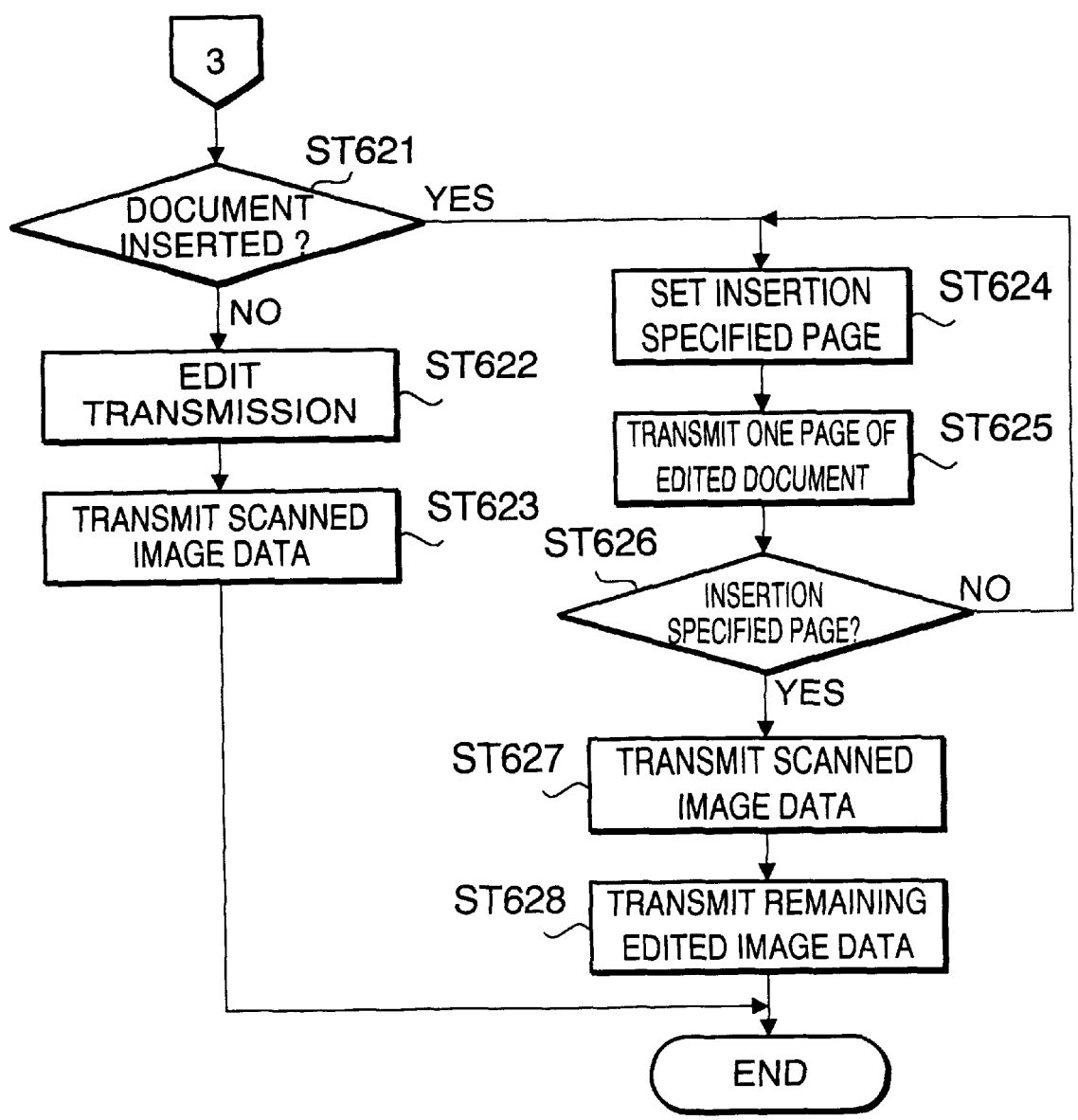
FIG. 9 is a flow diagram showing a document transmission operation of the facsimile apparatus according to the embodiment above.
Figure 10:
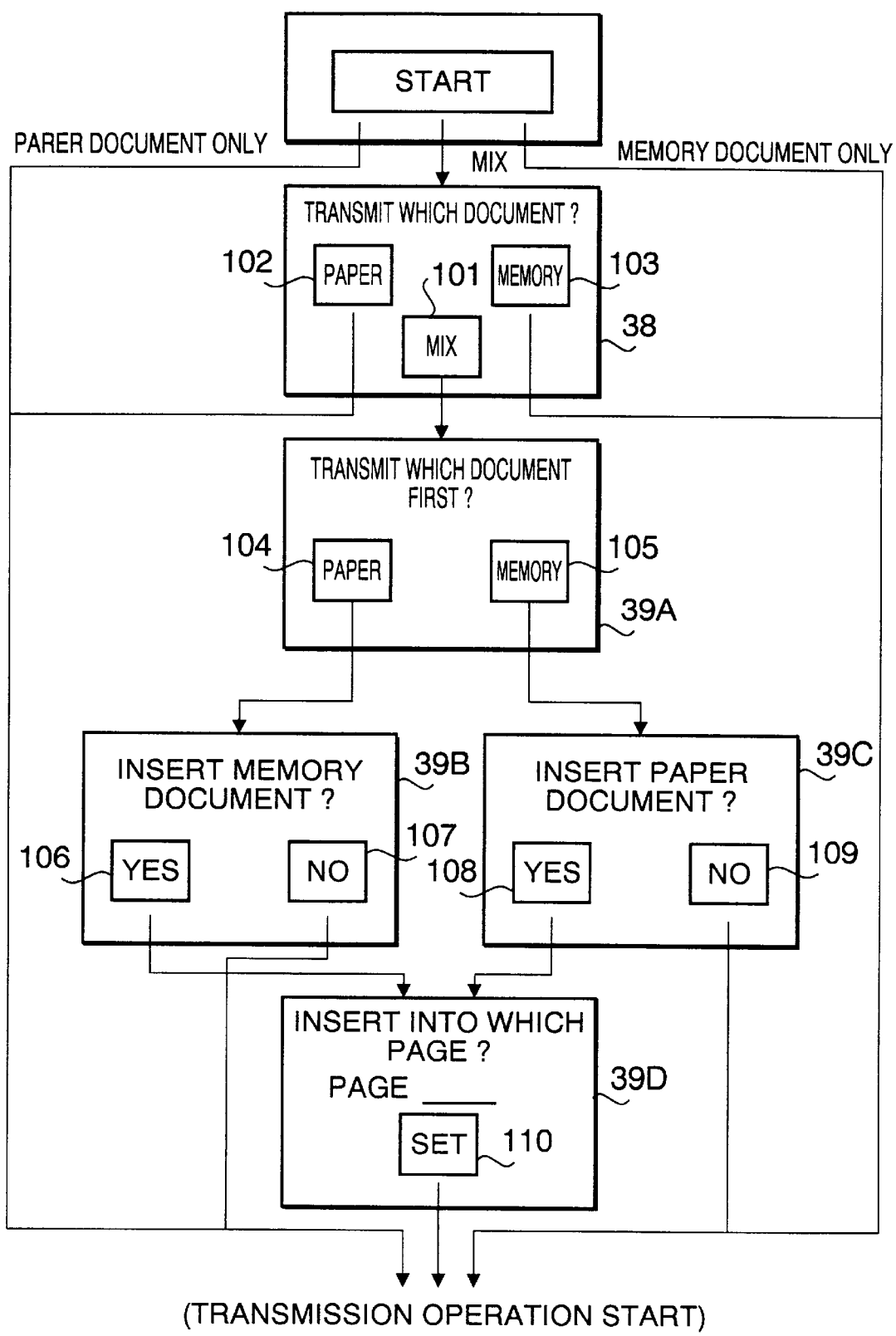
FIG. 10 is a drawing showing screen transitions during document transmission of the facsimile apparatus according to the embodiment above.

On the other hand, in ST608, if the edited document is selected to be sent first, in ST621 shown in FIG. 9, it is checked whether or not the paper document is inserted into the edited document. In this step, as shown in FIG. 10, screen 3a displays arrangement screen 39C including "YES" and "NO" icons 108 and 109. If the operator selects "NO", in ST622, the edited image data are sent by FAX control section 36. When transmission of the edited image data is completed, in ST623, the paper document is scanned by scanner 22 and the scanned image data are sent by FAX control section 36, which completes the operation.

On the other hand, if the operator selects "YES" in ST621, the flow advances to ST624 and the insertion specified page for inserting the edited image data is set. Then, in ST625, one page of the edited document is sent. In ST626, decision section 33 checks whether or not the next page is the insertion specified page. If it is not the insertion specified page, the flow goes back to ST624 and the next edited document is sent.

In ST626, if the next page is the insertion specified page, the paper document is scanned by scanner 22 in ST627 and the scanned image data are sent. In ST628, the rest of the edited document is sent, which completes the operation.

Control information table 34 stores not only the total number of documents sent, number of paper documents, number of memory documents, but also page numbers of the paper document and page numbers of the memory documents.

As described above, according to facsimile apparatus 1 of the present invention, the operator can carry out FAX transmission of a mixture of edited documents created and edited on RAM 13 and paper documents scanned by scanner 22. In other words, the operator can send edited documents and paper documents altogether to a same destination through one FAX transmission operation. Therefore, if a cover sheet is included in either an edited document or paper document, the operator can send the document by inserting another document into the document containing the cover sheet. Therefor the recipient party can save the trouble of rearranging the received documents. Furthermore, the operator can select which of the two documents should be sent first on arrangement screen 39A, and thus the operator can insert the cover sheet into either document.

Figure 6:
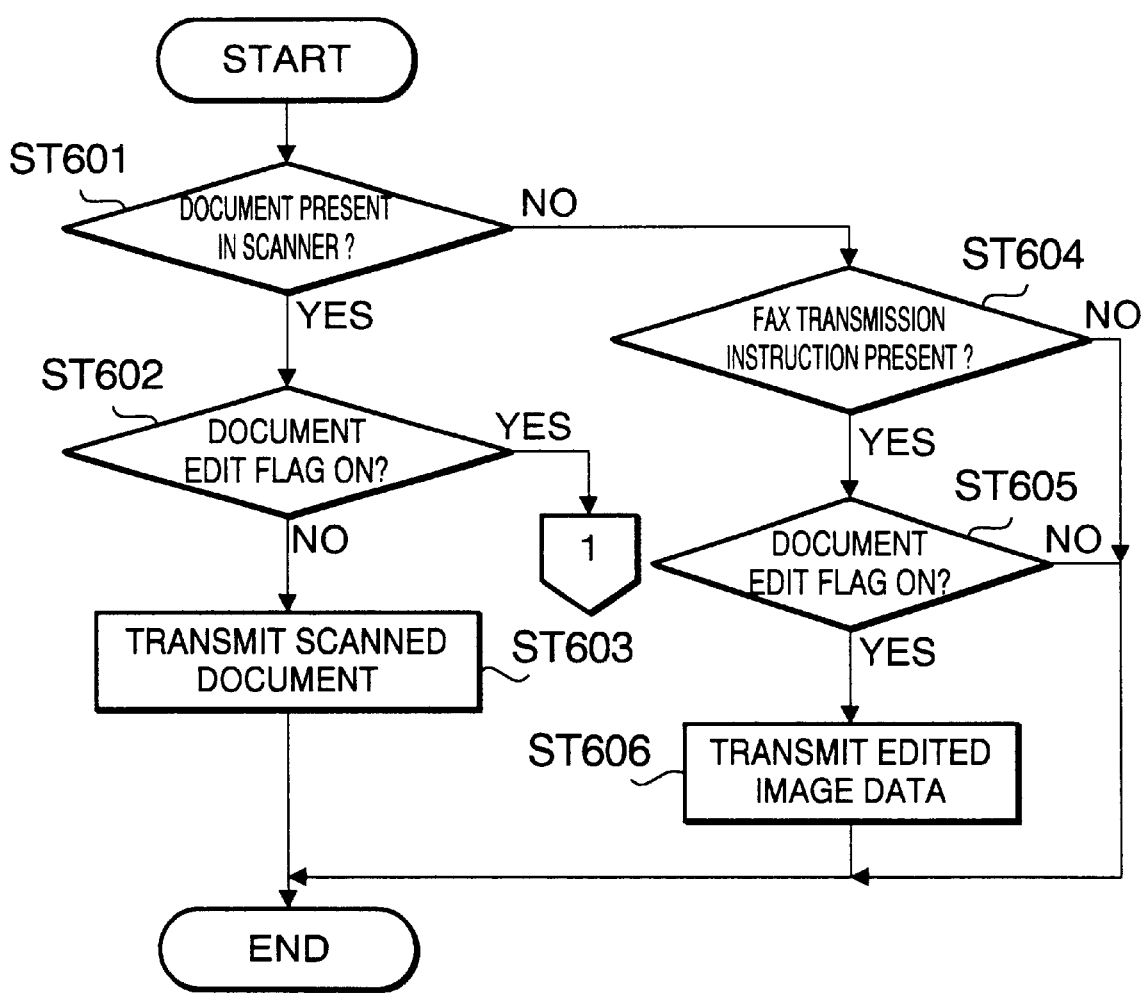
FIG. 6 is a flow diagram showing a document transmission operation of the facsimile apparatus according to the embodiment above.
Figure 7:
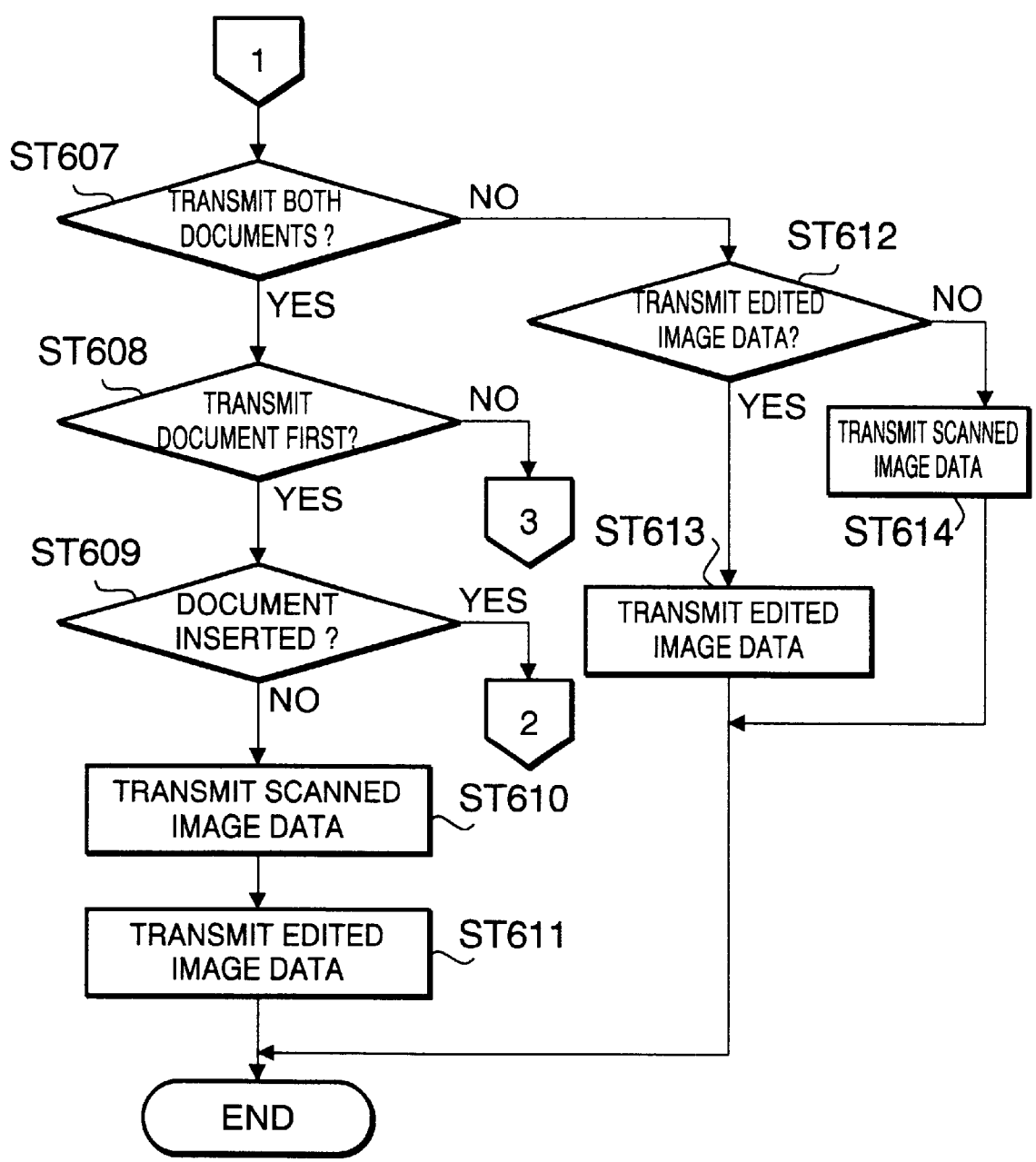
FIG. 7 is a flow diagram showing a document transmission operation of the facsimile apparatus according to the embodiment above.

Moreover, as in steps ST601 and ST602 shown in FIG. 6, if document sensor 22a detects that a paper document has been set in scanner 22 and at the same time document edit flag 32 is ON, the flow advances to ST607 and subsequent steps in FIG. 7. Therefor the flow can automatically advance to an operation of transmitting a mixture of the paper document and edited document without requiring the operator to perform special operations, which will simplify operations.

Furthermore, selection screen 38 shown in FIG. 10 allows the operator to select whether to send the paper document only, edited document only or both of them, thus preventing the edited document stored in memory from being sent mistakenly against the will of the operator.

As in ST615 in FIG. 8 and ST624 in FIG. 9, the operator can specify the pages of one document in which the other document is inserted. For example, when the operator wants to modify only arbitrary pages of the received document, the operator can print out the desired pages by printer 23, modify them by handwriting, scan the modified paper document using scanner 22, insert them into the received document in memory and send them. As a result, while conventional software facsimile apparatuses need to display the desired pages on a touch panel display screen and correct them, the present embodiment allows modifications by handwriting. Furthermore, while conventional facsimile apparatuses need to print out all documents, add modifications to the relevant pages by handwriting, then scan all documents before sending them, the present embodiment only requires printing and scanning of the relevant pages, leading to a reduction of both operation time and costs.

The present invention is not limited to the above embodiment. For example, in the above embodiment, one document is inserted into another document, but documents can also be replaced in such a way that some specified pages of one document are deleted and another document is inserted there.

As described above, the present invention allows a mixture of documents created on a screen and scanned documents to be sent through simple operations.

Moreover, a touch panel display was taken as an example to explain the above embodiment, but the LCD display and touch panel can also be configured separately. Furthermore, an LCD display was taken as an example of display section to explain the above embodiment, but the display section can also include a CRT display and other display apparatuses.

A facsimile apparatus was taken as an example to explain the above embodiment, but the scope of the present invention can also include other image transmission apparatuses. For example, it includes a PC with a scanner to scan documents and a FAX modem connected via an external I/O interface. It also includes a copier or multi-function image processing apparatus that comprises a facsimile communication function as well as image edit function.

The above embodiment explains a case where image data are transmitted using a facsimile communication protocol over PSTN. However, as disclosed in the U.S. Pat. No. 5,881,233, a so-called Internet facsimile (IFAX) that transmits image data using an Internet communication protocol over the Internet also falls within the scope of the present invention.

The scope of the present invention also includes a computer-readable storage medium that store a program code instructing a computer to execute processing similar to that executed by the CPU in the facsimile apparatus according to the above embodiment.

The present invention is not limited to the above described embodiments, and various variations and modifications may be possible without departing from the scope of the present invention.

This application is based on the Japanese Patent Application No. HEI 10-370615 filed on Dec. 25, 1998, entire content of which is expressly incorporated by reference herein.

What is claimed is:

1. An image transmission apparatus, comprising:
an image memory that stores editable image data;

a display that displays the editable image data;

an editor that edits the editable image data displayed on a screen of said display and stores the edited image data in said image memory;

a scanner that scans documents to obtain scanned image data; and a transmitter that is configured to combine the scanned image data with the edited image data, and that is configured to selectively transmit the scanned image data to a destination, the editable image data to a destination and the combined image data, comprising discrete pages of editable image data and of scanned image data, to a destination.

2. The image transmission apparatus according to claim 1, further comprising an inputter that designates one of the scanned image data and the edited image data to be transmitted first.

3. The image transmission apparatus according to claim 1, further comprising an inserter that inserts the scanned image data into a variable location within a plurality of pages of the edited image data.

4. The image transmission apparatus according to claim 1, further comprising a page number memory that stores page numbers of respective scanned image data and edited image data, transmitted to the destination.

5. The image transmission apparatus according to claim 4, wherein said page number memory stores identification information that identifies whether respective image data is edited image data or scanned image data.

6. The image transmission apparatus according to claim 1, further comprising an inserter that inserts the edited image data into an operator defined variable location within the plurality of pages of the scanned image data.

7. The image transmission apparatus according to claim 6, further comprising an inputter that inputs a page number of the scanned image data into which said inputter inserts the edited image data.

8. An image transmission apparatus, comprising:

an image memory that stores first image data;

a display that displays the first image data;

a scanner that scans documents to obtain second image data when the first image data is stored in said image memory;

a transmitter that is configured to combine the second image data with the first image data, and that is configured to selectively transmit the first image data to a destination, the second image data to a destination and the combined image data, comprising discrete pages of editable image data and of scanned image data, to a destination; and an inputter that designates one of the first image data and the second image data to be transmitted first.

9. An image transmission apparatus, comprising:

an image memory that stores first image data;

a display that displays the first image data;

a scanner that scans documents to obtain second image data;

an inserter that inserts the first image data into a location within a plurality of pages of the second image data; and a transmitter that is configured to combine the second image data with the first image data, and is configured to selectively transmit the first image data to a destination, the second image data to a destination and the combined image data, comprising discrete pages of editable image data and of scanned image data, to a destination.

10. A method for transmitting image data, comprising:

displaying editable image data;

editing the editable image data displayed on a screen of a display and storing the edited image data in an image memory;

scanning documents to obtain scanned image data;

combining the scanned image data with the edited image data, and selectively transmitting the scanned image data to a destination, the edited image data to a destination and the combined image data, comprising discrete pages of editable image data and of scanned image data, to a destination.

* * * * *

UNITED STATES PATENT AND TRADEMARK OFFICE
CERTIFICATE OF CORRECTION

PATENT NO. : 6,552,827 B1 Page 1 of 1
DATED : April 22, 2003
INVENTOR(S) : H. Shimoosawa et al.

It is certified that error appears in the above-identified patent and that said Letters Patent is hereby corrected as shown below:

<u>Title page,</u>
Item [56], References Cited, FOREIGN PATENT DOCUMENTS, "3-79365" should be -- 3-97365 --.

Signed and Sealed this

Twentieth Day of January, 2004

JON W. DUDAS
*Acting Director of the United States Patent and Trademark Office*